United States Patent [19]
Mutschler et al.

[11] Patent Number: 5,207,471
[45] Date of Patent: May 4, 1993

[54] VEHICLE VDU WORKSTATION

[75] Inventors: Jürgen Mutschler, Au am Rhein; Gerd Seidenfaden, Leonberg; Johann Tomforde, Sindelfingen, all of Fed. Rep. of Germany

[73] Assignee: Mercedes-Benz AG, Fed. Rep. of Germany

[21] Appl. No.: 855,748

[22] Filed: Mar. 23, 1992

[30] Foreign Application Priority Data

Mar. 22, 1991 [DE] Fed. Rep. of Germany ....... 4109497

[51] Int. Cl.$^5$ .............................................. B60R 7/00
[52] U.S. Cl. .................................................. 296/37.12
[58] Field of Search ................. 296/37.12, 37.8, 37.16; 224/42.42

[56] References Cited

U.S. PATENT DOCUMENTS

| | | | |
|---|---|---|---|
| 2,789,861 | 4/1957 | Hudson | 296/37.12 |
| 3,503,648 | 3/1970 | James | 296/37.12 |
| 3,606,447 | 9/1971 | Ryding | 296/37.12 |
| 4,706,810 | 11/1987 | Petrilli | 296/37.12 X |

FOREIGN PATENT DOCUMENTS

| | | |
|---|---|---|
| 4001448 | 1/1990 | Fed. Rep. of Germany . |
| 2240073 | 7/1991 | United Kingdom . |

OTHER PUBLICATIONS

DE-Z Mercedes-Benz intern, Heft Jun. 1989 p. 11.

*Primary Examiner*—Robert R. Song
*Attorney, Agent, or Firm*—Evenson, Wands, Edwards, Lenahan & McKeown

[57] ABSTRACT

A vehicle VDU workstation is matched to specific safety requirements in a motor vehicle and essentially comprises, as physical elements of a working unit, a keyboard and a flat screen which can be folded onto the latter. A sliding guide allows those parts, on one hand, to be stowed in the glove compartment of the vehicle in a space-saving manner and, on the other hand, also placed in a use position on the folded-out glove compartment door. In the stowed position, the working unit is located behind the glove compartment door. Special mounting elements, some of which at least can be stowed in the glove compartment, allow the VDU workstation also to be used in other seats in the vehicle by being suspended behind backrests of vehicle seats from headrest supports and, to this extent, placed there in a use position. Vibrations of the working unit are weakened by damping elements. When at least one accident-specific force is exerted, either deformation and/or predetermined break points are triggered in order to change the configuration of the VDU workstation into a less cumbersome one.

9 Claims, 1 Drawing Sheet 5,207,471

VEHICLE VDU WORKSTATION

BACKGROUND AND SUMMARY OF THE INVENTION

The present invention relates to a VDU workstation in a vehicle, and more particularly, to a vehicle workstation with a flat screen and keyboard in which the screen can be pivoted out of a stowed portion into an upright reading position.

A VDU workstation in a vehicle which provides a passenger with the possibility of working on a VDU is already known as seen, for example, in DE-Z: "Mercedes-Benz intern" (Mercedes Benz internal publication, Issue 6/89, page 11), which was presented at the Internationalen Automobil Ausstellung IAA (International Motor Show) in 1989. A conventional laptop personal computer was installed in a folding table at the rear of the backrest of the front passenger seat and was accessible from the corresponding rear seat.

This solution based on a commercially available laptop personal computer and a folding table restricts the operator to working on a quite specific, fixed seat in the vehicle which is predetermined by the location where such a folding table is mounted. If such a folding table is installed in the backrest of the front passenger seat this would be, for example, the seat located therebehind. The same remarks apply to a different solution which was disclosed in Patent Application P 40 01 448.7-21.

Each of the known solutions requires a special design of the backrest to provide sufficient stowing space for a folding table or a complete operating element of a PC. The expenditure on maintaining the comfort of the seat and suspension and protection against accidents can be considerable. There is also a requirement to be able to move a corresponding workstation within the vehicle as desired.

An object of the present invention is to provide a VDU workstation in a vehicle which, on one hand, takes up a small amount of space in the immediate surroundings of its user and, on the other hand, is not fixed, as far as its place of use is concerned, to a specific stowing location in the vehicle so that, when not in use, it can be installed easily in a conventional stowing location.

This object has been achieved in the case of a VDU workstation by dimensioning and configuring the keyboard and screen such that, when in a folded-together state in a position essentially parallel with the closed door of a correspondingly shaped glove compartment, these components can be lowered into the compartment, and providing the keyboard and glove compartment door with structure to permit the keyboard to be mounted or locked on the inner face of the door and also to weaken or suppress vibrations of the door.

According to the present invention, the VDU workstation consists essentially of a mobile working unit comprising at least one screen and one keyboard and mounting elements which can be folded up or mounted on the latter, in particular can engage thereon and permit the working unit to be fixed and used at different locations in the vehicle and to be stowed in a space-saving manner in the glove compartment of the vehicle. As a result, the restriction of only being able to work on one special seat no longer has to be accepted.

The working unit of the VDU workstation of the present invention can be configured similarly to a conventional laptop computer. A special worktable is not required. Consequently, a VDU workstation according to the present invention requires significantly less stowing space than a conventional laptop personal computer with worktable. The housing of the working unit is preferably configured with a rounded contour and provided with a soft-elastic surface. In addition, mounting elements for attaching the workstation behind a backrest are provided which are either permanently connected to the working unit and constructed so as to be folded out from the latter or else constructed as loose elements and, as such, capable of being stored in the upper area of the glove compartment. They are preferably constructed, or capable of being mounted on the working unit, such that the use position or configuration of the workstation is automatically changed or destroyed in the event of an effect of force due to an accident so that injuries in the event of an accident are effectively prevented.

BRIEF DESCRIPTION OF THE DRAWINGS

These and other objects, features and advantages of the present invention will become more apparent from the following detailed description of a currently preferred embodiment when taken in conjunction with the accompanying drawings wherein.

DETAILED DESCRIPTION OF THE DRAWINGS

Figure 1:
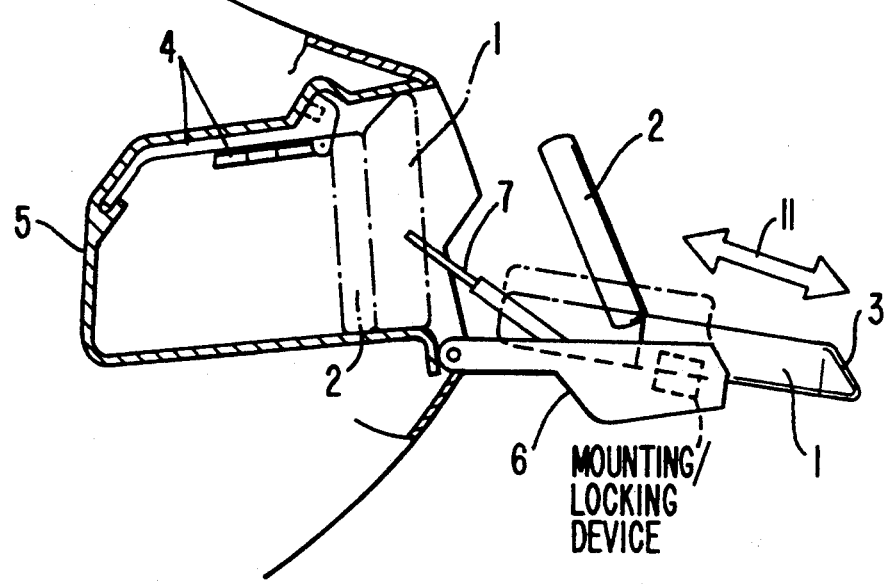
FIG. 1 is a schematic view of the VDU workstation shown, by way of example, both stowed substantially vertically (dot-dash lines) in the glove compartment and in use in front of the glove compartment.

Referring now to FIG. 1, the exemplary ready-to-use VDU workstation shown here, on one hand, in the stowed position and, on the other hand, in the position of use in front of a glove compartment of a vehicle consists of at least two physical components, namely a keyboard 1 and a screen 2. The screen 2 is connected to the keyboard 1 such that it can be pivoted out of a stowed position with respect to the keyboard 1 (screen folded down on keyboard) into a reading position inclined at an angle for optimum viewing. Furthermore, a handrest 3 can be provided on the keyboard 1.

In order to minimize the possibility of injuries in the event of an impact of the user, the keyboard 1 (and if necessary also the handrest 3 pointing towards the user) is configured without pronounced corners and preferably rounded with the largest possible radii and/or elastically upholstered. The screen 2 can also have a circumferentially upholstered particularly soft edge. For the purpose of energy absorption when a specific limit load is exceeded, at least the keyboard 1 can also be deformable in a defined manner.

The screen 2 is constructed as a flat screen and preferably finished such that, when in its stowed position on the keyboard, its rear can be used as a table surface. Its viewing face is preferably protected against splintering with a protective film which is tough elastic and at the same time performs in a reflection-reducing manner. Even in the configuration when used as a table, the screen 2 provides a high degree of protection against accidents due to the aforementioned rounding-of and/or elastic upholstering of all the edges and corners.

A complete computer can be installed in the keyboard 1. The keyboard and screen can also be a specially designed laptop or notebook PC which is modified, for example expanded with the handrest 3, in accordance with the special requirements in the vehicle.

The handrest 3 mounted in front of the keyboard 1 is configured such that, in the event of an impact, the user is protected from the more rigid keyboard 1. For this purpose, the handrest 3 is produced at least on its surface from a soft-elastic or plastically deformable material which will not splinter under any circumstances. Preferably, a foamed material can be used. The handrest 3 can be adjustable with respect to its position in relation to the keyboard.

The pivot mechanism (not shown) between keyboard 1 and screen 2 can also be constructed such that, in the event of an impact, the screen 2 can be disconnected (in particular unlatched or disengaged) from the keyboard 1 depending on the direction of impact of a part of the user's body thereagainst. Furthermore, cooperative mounting structure 4 is provided which are constructed so as to be connected or connectable at least partially to the keyboard 1 in a more or less permanent manner. Nevertheless, in its stowed position at least one part of the structure 4 can be mounted near to the ceiling of the glove compartment 5. For this purpose, special bearing or fixing elements can be formed or provided in the upper region of the compartment and hold the at least one part of the cooperative fixing structure 4 in the stowed position and thus keep free the lower part of the glove compartment for conventional use.

The movement arrow 11 indicates that the keyboard 1 is mounted on the inside of the folding-down glove compartment door 6 so as to be at least movable, i.e. displaceable. As a result, together with the screen 2 folded onto the keyboard in the position of rest, the keyboard 1 can be folded up and into the glove compartment 5 together with the glove compartment door 6 when in the inserted state with respect to the door 6. As a result, the working unit can thus be stowed behind the folded-shut glove compartment door 6 in a "standing" position and, to this extent, can be stowed in a space-saving way in the glove compartment. In the state in which it is withdrawn to a greater or lesser extent with respect to the opened glove compartment door 6, the keyboard 1 assumes a position of use. For this purpose, the screen 2 is folded up to a viewing angle favorable for the user.

Furthermore, in order to be able to fix the keyboard in a defined manner both in its stowed position and in its position of use, cooperative mounting or guiding and locking apparatus (not shown) can be provided, e.g. in the form of engagement elements, both on the underside of the keyboard 1 and on the inside of the glove compartment door to permit the keyboard 1 which is preferably movably guided in a sliding fashion to be securely mounted in two end positions and, if required, also in at least one, but preferably in a plurality of intermediate, selectable working position in relation to the glove compartment door 6.

A damping element 7 is coupled to the glove compartment door 6 and is mounted in the region of the glove compartment frame. On one hand, the element 7 damps rapid or jolting movements or vibrations of the glove compartment door, but, on the other hand, permits the glove compartment door 6 to be folded up by the user. The damping element 7 can be, for example, a pneumatic suspension which can be coupled such that it generates a tipping force and thus helps to keep the glove compartment door closed in the stowed position.

The sliding guide of the keyboard 1 on the inside of the glove compartment lid is preferably constructed such that the VDU workstation can be easily released as a complete unit from the latter, for example in a special displacement position and/or after activation of a releasing blocking or locking element comparable with the function of a rapid-action coupling. In the illustrated position of use shown in front of a glove compartment, mounting elements 4, which can be stowed in the glove compartment 5, are not required and, to this extent, can be configured to be left in the glove compartment.

Figure 2:
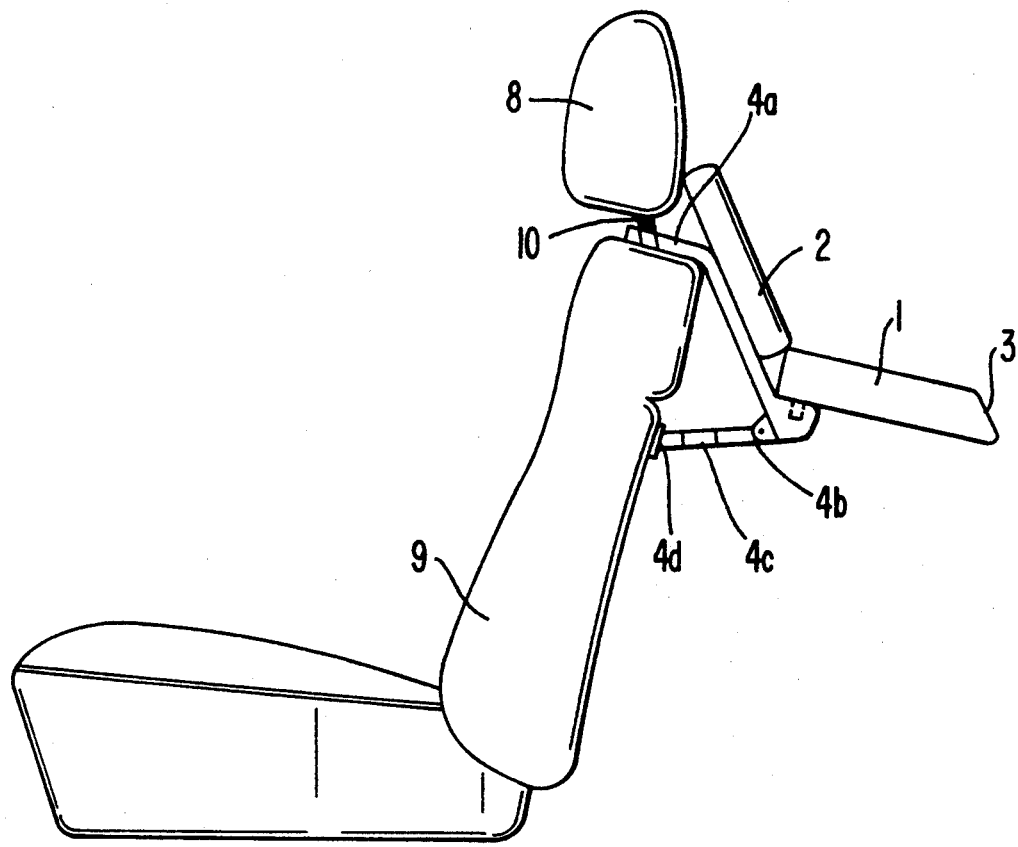
FIG. 2 is a schematic view of the VDU workstation of the present invention attached, for example, to a backrest of a vehicle seat.

FIG. 2 illustrates the use of the VDU workstation according to the present invention behind the backrest 9 of a vehicle seat 11 using the mounting elements 4 of FIG. 1, which elements are divided up, for example, into at least one suspending arm 4a which is constructed so as to be suspended or latched onto the headrest support 10 of the backrest, a support 4b with at least one damping element 4c mounted or integrated therein and at least one position-stabilizing and force-transmitting adhesion element 4d, e.g. a suction face constructed as two suction cups.

The mounting elements 4a to 4d can thus as an entirety form a three-point or four-point bearing of the keyboard 1 and of the screen 2 on the vehicle seat backrest 9, mounted in front thereof or of the support 10 of the seat headrest 8. Preferably, the suspending arm 4a can be constructed as a support for the screen 2 but it may also contain a joint or a crumple or deformation zone (not shown) which permits at least one suspending arm 4a to fold downwardly if, in the event of excessively large force being exerted on the keyboard 1 or the support 4c, either the at least one damping element 4c or a specifically constructed predetermined deformation point (not shown here) gives way in a defined manner in order to consume impact energy and cause the overall configuration of the workstation to be changed into a less cumbersome one.

In conjunction with the above, the fixing of the VDU workstation to the mounting element can be effected such that, when at least the support 4c changes its shape, at least the keyboard 1 is released from the mounting elements 4a to 4d. Of course, with a suitable configuration, the working unit of the VDU workstation, when released from mounting elements or from the door of the glove compartment, can also be used universally as a PC outside the vehicle.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A VDU workstation in a vehicle, comprising a working unit having at least a keyboard and a flat screen configured and operatively connected with the keyboard so as to be pivotable out of a stowed position in which the screen lays on the keyboard into an upright reading position, wherein the operatively connected keyboard and screen are dimensioned and configured to be, when in a folded-together state in a position which is essentially parallel with a closed door of a correspondingly-shaped glove compartment of the vehicle, lowerable into the glove compartment, and means operatively connected with the keyboard and the glove compartment door for, on one hand, permitting the keyboard to be at least one of mounted and locked on the inner face of the door and, on the other hand, diminishing vibrations of the door.

2. The VDU workstation according to claim 1, wherein the means is configured and connected to the keyboard to permit a displacement of the keyboard in a longitudinal direction of the vehicle with respect to the door and the keyboard is configured to be at least one of locked or fixed on the door in at least two predetermined positions with respect thereto and can be released from the door in at least one position.

3. The VDU workstation according to claim 1, wherein a handrest is operatively mounted in front of the keyboard as an extension thereof and is made of substantially one of elastically and plastically deformable material.

4. The VDU workstation according to claim 1, wherein cooperative mounting means are provided in operative relationship with the working unit for suspending the working unit on a vehicle seat backrest from a headrest support and resting the working unit against the rear of the backrest.

5. The VDU workstation according to claim 4, wherein at least one part of the cooperative mounting means is a force-transmitting adhesion element which causes at least one other part of the cooperative mounting means to rest against the rear of the vehicle seat backrest in a stable fashion; at least one part of the cooperative mounting means is a damping element; and at least one part of the cooperative mounting means has a deformation or predetermined break point which, in the event of an inadmissably large, accident-specific force brings about a transition of the VDU workstation suspended behind the vehicle seat into a less cumbersome configuration.

6. The VDU workstation according to claim 5, wherein at least one part of the cooperative mounting means is mounted on the keyboard in a movable but captive manner.

7. The VDU workstation according to claim 4, wherein the cooperative mounting means is configured and operatively arranged in relation to the glove compartment such that at least one part of the cooperative mounting means is stowable in the glove compartment, and a ceiling of the glove compartment is shaped so as to match the at least one part of the cooperative mounting means such that the at least one part is adapted to be fixed, via the shaping, to the ceiling of the glove compartment.

8. The VDU workstation according to claim 1, wherein the keyboard and screen have a rounded configuration without pronounced corners; at least the screen has a circumferentially upholstered or soft edge; the viewing face of the screen is covered with a tough, splinter-preventing film which at the same time has a reflection-reducing effect, and the rear of the screen is configured to be used as a table surface.

9. The VDU workstation according to claim 1, wherein at least one of the screen is releasably connected to the keyboard and the keyboard is deformable in a predetermined manner for energy absorption.

* * * * *